United States Patent [19]

Neuhof

[11] Patent Number: 5,533,763
[45] Date of Patent: Jul. 9, 1996

[54] ELBOW WITH ACCESS OPENING

[75] Inventor: Markus Neuhof, Ehringshausen, Germany

[73] Assignee: Rittal-Werk Rudolf Loh GmbH & Co. KG, Germany

[21] Appl. No.: 306,507

[22] Filed: Sep. 14, 1994

[30] Foreign Application Priority Data

Sep. 14, 1993 [DE] Germany ............... 43 31 125.3

[51] Int. Cl.⁶ ............................................. F16L 43/00
[52] U.S. Cl. .................................... 285/127; 285/179
[58] Field of Search ............................ 285/127, 179, 285/121

[56] References Cited

U.S. PATENT DOCUMENTS

| | | | |
|---|---|---|---|
| 304,930 | 9/1884 | Herbert | 285/127 |
| 873,300 | 12/1907 | Cranston | 285/127 |
| 916,932 | 3/1909 | McMurtrie | 285/127 |
| 960,744 | 6/1910 | Vogel | 285/127 |
| 1,595,841 | 8/1926 | Wang | 285/127 |
| 1,681,097 | 8/1928 | Church | 285/127 |
| 2,955,851 | 10/1960 | Scott | 285/127 |
| 3,168,104 | 2/1965 | Mathis | 285/127 |
| 4,073,514 | 2/1978 | Pate | 285/127 |
| 4,508,371 | 4/1985 | Maier | 285/127 |

FOREIGN PATENT DOCUMENTS

| | | | |
|---|---|---|---|
| 742393 | 3/1933 | France | 285/127 |
| 442004 | 3/1927 | Germany | 285/127 |
| 3805422 | 12/1988 | Germany . | |
| 8902061 | 6/1989 | Germany . | |
| 4003992 | 8/1991 | Germany . | |
| 4033747 | 4/1992 | Germany . | |

*Primary Examiner*—Eric K. Nicholson
*Attorney, Agent, or Firm*—Speckman, Pauley & Fejer

[57] ABSTRACT

An elbow for a suspension device supporting a control element or the like, the elbow comprising two support arm fastening walls oriented at an angle to each other, on which support arms, which are embodied as hollow profiled sections, can be fastened. The elbow allows the easy insertion of a cable or the like, even with support arms embodied as a closed hollow profile section, and has a high degree of torsional rigidity. The support arm fastening walls are connected to each other in one piece by lateral walls which terminate flush with the free ends of the support arm fastening walls and form an assembly chamber behind the support arm fastening walls which is accessible through an opening. The outsides of the support arm fastening walls facing away from each other form receptacles for installing the support arms, and cable feed-through elements are cut into the support arm fastening walls at least in the area of the receptacles.

11 Claims, 2 Drawing Sheets

ELBOW WITH ACCESS OPENING

BACKGROUND OF THE INVENTION

1. Field of the Invention

This invention relates to an elbow for a suspension device supporting a control element or the like, wherein the elbow has two support arm fastening walls oriented at an angle to each other, on which the support arms, which are embodied as hollow profiled sections, can be fastened.

2. Description of Prior Art

An elbow of this type is taught by German Patent Publication DE 38 05 422 C1. The two support arm fastening walls are reinforced in respect to each other by an inclined connecting bridge. Support arms are pushed on guide plates on the sides of the support arm fastening walls, which face away from the connecting bridge. The support arm has an open cable conduit which can be closed by a cover. Cables inserted into the cable conduit are turned over the connecting bridge and inserted into the cable conduit of the second support arm.

With elbows of this type, the insertion of cables or the like into the supplied support arms, which enclose the cable conduit in the form of closed hollow sections, is difficult, because the connecting bridge blocks the access to the cable conduit.

SUMMARY OF THE INVENTION

It is an object of this invention to provide an elbow of the type described hereinabove which allows a simple insertion of cables and the like, even into support arms embodied as closed hollow sections, but still has a high degree of torsional rigidity.

This object is attained by an elbow for a suspension device in accordance with one embodiment of this invention in which the support arm fastening walls are connected to each other in one piece by lateral walls which terminate flush with the free ends of the support arm fastening walls and form an assembly chamber behind the support arm fastening walls which is accessible through an opening. On the sides facing away from each other, the support arm fastening walls form receptacles for installing the support arms and cable feed-through elements are cut into the support arm fastening walls at least in the area of the receptacles.

A cable can be easily inserted into the cable channel of the support arm or led out of it through the cable feed-through element in the support arm fastening wall. The assembly chamber, which is easily accessible through the opening, offers sufficient space for the easy manipulation of the cable in the area of the elbow. The lateral walls connect the two support arm fastening walls on both sides, by means of which a high degree of torsional rigidity is achieved without access to the cable feed-through elements being blocked. The support arms are simple to install. For this purpose, they are inserted into the receptacles provided for this and bolted from the backs of the support arm fastening walls.

In accordance with one preferred embodiment of this invention, the receptacle is cut out of the support arm fastening wall to receive a support arm with an essentially oval cross section.

If the support arm extends horizontally, it is arranged in such a way that the large semi-axis of the oval cross section extends vertically. As a result, high loads can be applied. The support arm has great flexural strength so that it is only slightly deflected under load. The receptacle is formed so as to be adapted to the cross section of the support arm, whereby it is possible to preposition the arm in the receptacle and bolt it easily together with the elbow.

In accordance with another embodiment of this invention, the receptacle is formed by an annular collar which projects away from the support arm fastening wall. In this case, the annular collar can be formed in a circle on the support arm fastening wall or only extend over partial areas.

In accordance with yet another embodiment, the receptacle has a flat surface on which the flat end of the support arm is supported flush. As a result, the support arm can be cut to desired lengths from a semi-finished product. Finishing of the ends of the support arm is no longer necessary.

To achieve an improved appearance and to cover the opening and the assembly chamber in a dust-protected manner, the opening is closed by a cover which is locked in and/or bolted together with the lateral walls and/or the support arm fastening walls.

In accordance with another embodiment of this invention, the assembly chamber is also sealed in a moisture-proof manner by the cover.

In accordance with one embodiment, the cover is made of sheet steel or plastic, thereby enabling it to be produced in a cost-effective way.

BRIEF DESCRIPTION OF THE DRAWINGS

These and other objects and features of this invention will be better understood from the following detailed description taken in conjunction with the drawings wherein.

DESCRIPTION OF THE PREFERRED EMBODIMENTS

Figure 1:
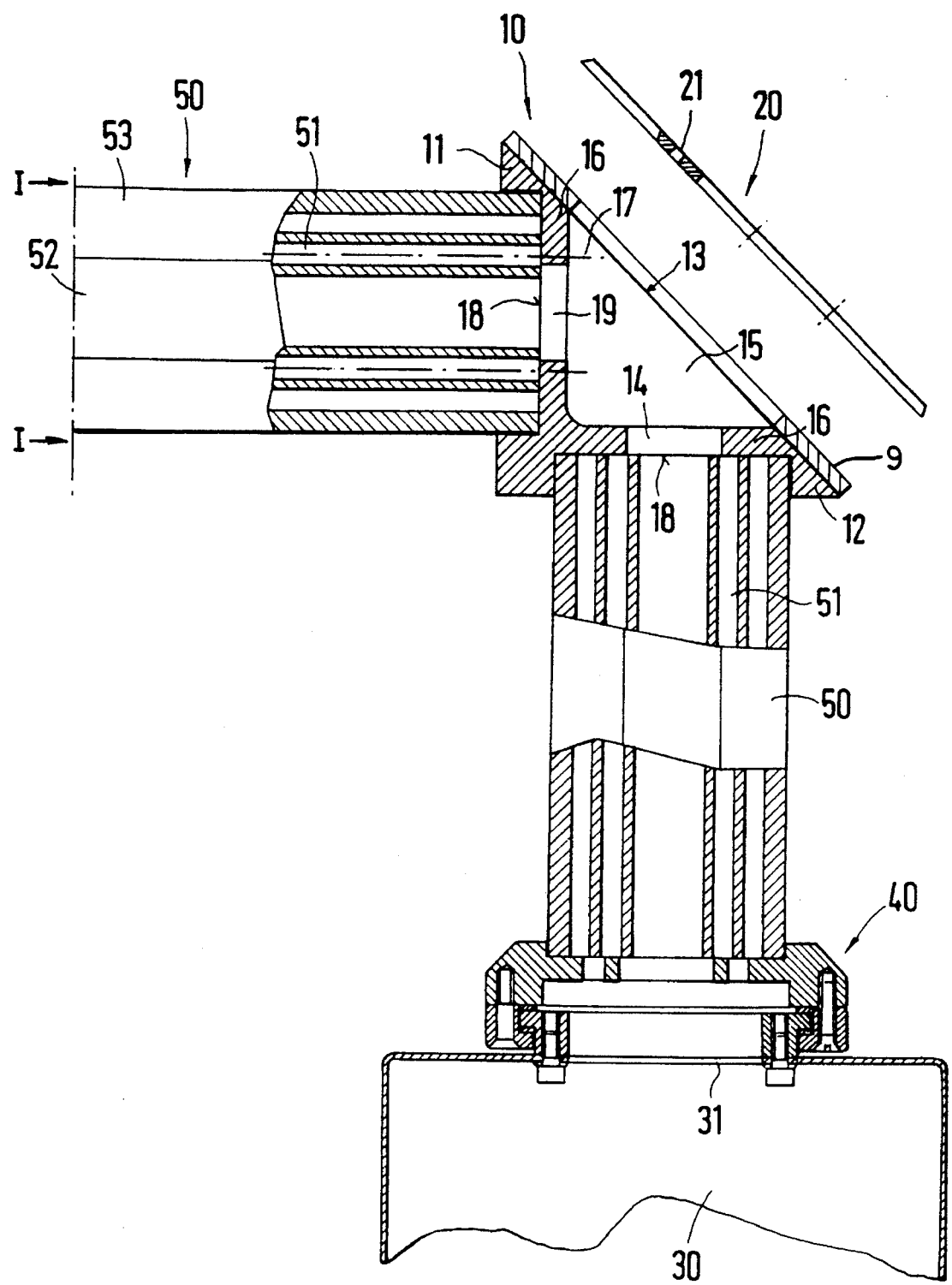
FIG. 1 figure which shows a portion of a support device in accordance with one embodiment of this invention in a longitudinal cross-sectional view.

A portion of a support device for a control element 30, having an elbow 10 and two support arms 50, in accordance with one embodiment of this invention, is shown in the FIG. 1. The elbow 10 comprises two support arm fastening walls 11, 12, disposed at right angles to each other and connected in one piece. The two support arm fastening walls 11, 12 are connected by lateral walls on the side of the right angle.

Figure 2:
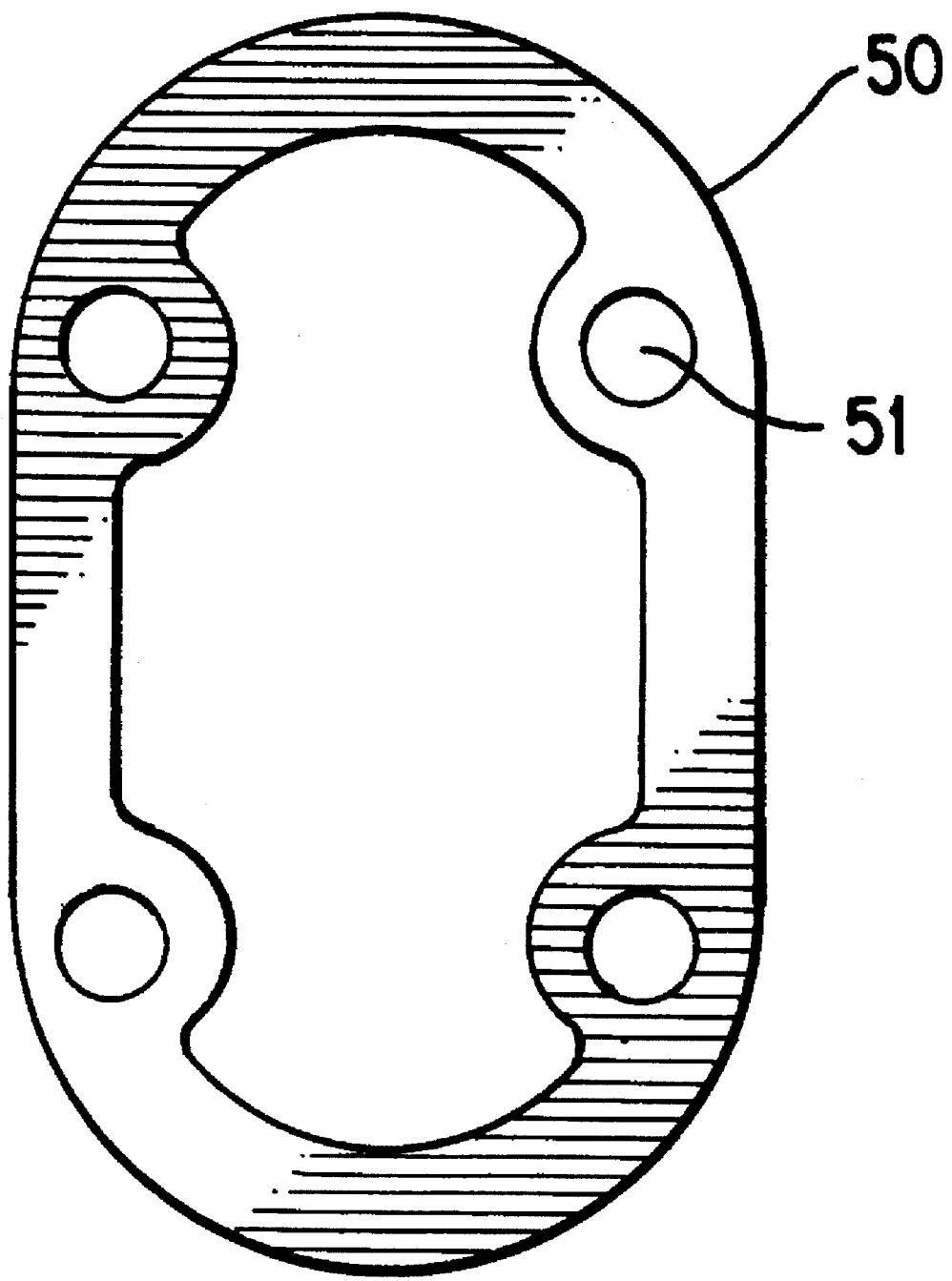
FIG. 2 shows a cross-sectional view of the support device shown in FIG. 1 in the direction of I—I.

The lateral walls terminate flush with the free ends of the support arm fastening walls 11, 12 and, together with the support arm fastening walls 11, 12, they enclose an assembly chamber 15. The assembly chamber 15 is accessible through an obliquely extending opening 13. The opening 13 itself can be closed by a cover 20 and a seal 9 to seal assembly chamber 15. For this purpose, the cover 20 has fastening receivers 21, into which fastening screws can be inserted and screwed into screw receivers of the lateral walls and the support arm fastening walls 11, 12. Receptacles 18 are formed by the sides of the support arm fastening walls 11, 12 facing away from each other. The receptacles 18 have flat surfaces into which the flat ends of the support arms 50 are inserted. The support arms 50 are formed of two vertical legs 52 which are spaced apart parallel to each other and are connected by two semicircular connecting parts 53. This results in an essentially oval cross section of the support arm 50 as shown in FIG. 2, to which the receptacle 18 is appropriately adapted. The support arm 50 is embodied as a closed hollow profiled section and encloses a cable conduit. Also in the interior of the support arm 50, longitudinally oriented screw conduits 51 are formed in one piece on the legs 52 and the connecting parts 53.

Fastening receivers 17 are formed by the support arm fastening walls 11, 12 and are aligned with the longitudinally oriented screw conduits 51, into which fastening screws can be inserted from the direction of the assembly chamber 15 and screwed into the screw conduits 51. In the process, the opening 13 allows easy access to the fastening receivers 17, so that a screw tool can be easily inserted into the assembly chamber 15.

Thus, the support arms 50 inserted and screwed into the receptacles 18 extend at right angles to each other. Openings embodied as cable feed-through elements 19, 14 are formed by the support arm fastening walls 11, 12. The cable feed-through elements 19, 14 are formed in the area of the receptacles 18, thereby providing access to the cable conduit of the support arm 50. The free end of the vertical support arm 50 supports a crown hinge 40 used for the rotatable fastening of a control housing 30.

An elbow 10 is shown in the drawing in accordance with one embodiment of this invention, wherein the support arm fastening walls 11, 12 are at right angles to each other. However, the support arm fastening walls 11, 12 may be arranged at any other angle in respect to each other, particularly at an angle of less than 90°. In this manner, the operating face of the control device 30 can be obliquely placed. For reasons of ergonomics, this is advantageous for some suspension devices. It is also possible to fasten the operating housing 30 or the crown hinge 40 directly on the elbow 10. Threaded receivers are formed by the operating housing 30 or the crown hinge 40 for this purpose and are aligned with the fastening receivers of the support arm fastening wall 12. The crown hinge 40 or the operating housing 30 can then be fastened by fastening screws.

For insertion into the suspension device, a cable or the like is pushed through the horizontal support arm 50 until it comes out of the cable feed-through element 19 of the support arm fastening wall 11. It is then possible to feed the cable or the like through the assembly chamber 15 and out of the opening 13. In the process, the cable or the like can be manually turned and pushed through the cable feed-through element 14 of the support arm fastening wall 12 into the vertical support arm 50. At the end of the support arm 50, the cable can then be guided through the connecting hinge 40 and through an opening 31 of the operating housing 30 into the interior of the operating housing 30. In this way, it is still possible to insert the cable or the like even after the suspension devices have already been assembled and fastened to a wall, ceiling or on a machine body.

What is claimed is:

1. In an elbow for a suspension device supporting a control element, wherein the elbow comprises two support arm fastening walls oriented at an angle to each other on which two support arms, which are embodied as hollow profiled sections, can be fastened, the improvement comprising:

the support arm fastening walls (11, 12) connected to each other in one piece by a plurality of lateral walls which terminate flush with the free ends of the support arm fastening walls (11, 12) and form an assembly chamber (15) behind said support arm fastening walls (11, 12) which is accessible through an opening (13), the surfaces of the support arm fastening walls (11, 12) facing away from each other each forming at least one receptacle (18) for installing the support arms (50), said at least one receptacle (18) having a shape suitable for receiving said support arm (50) having an essentially oval cross section, each of said support arm fastening walls (11, 12) forming at least one cable feed-through element (14,19) at least in the area of the receptacles (18), and each of said-support arm fastening walls (11, 12) forming at least one fastening receiver (17) aligned with a corresponding longitudinally oriented screw conduit (51) formed by said support arms (50).

2. In an elbow in accordance with claim 1, wherein the receptacle (18) is embodied as an annular collar projecting away from the support arm fastening wall (11, 12).

3. In an elbow in accordance with claim 1, wherein the receptacle (18) has a flat surface on which a flat end of the support arm is supported in an aligned way.

4. In an elbow in accordance with claim 1, wherein the opening (13) is closed by a cover (20), and the cover (20) is fixedly secured to at least one of the lateral walls and the support arm fastening walls (11, 12).

5. In an elbow in accordance with claim 4, wherein the cover (20) seals the assembly chamber (15) with a seal.

6. In an elbow in accordance with claim 4, wherein the cover (20) is made of one of sheet steel and plastic.

7. In an elbow in accordance with claim 2, wherein the receptacle (18) has a flat surface on which a flat end of the support arm is supported in an aligned way.

8. In an elbow in accordance with claim 7, wherein the opening (13) is closed by a cover (20), and the cover (20) is fixedly secured to at least one of the lateral walls and the support arm fastening walls (11, 12).

9. In an elbow in accordance with claim 8, wherein the cover (20) seals the assembly chamber (15) with a seal.

10. In an elbow in accordance with claim 8, wherein the cover (20) is made of one of sheet steel and plastic.

11. In an elbow in accordance with claim 9, wherein the cover (20) is made of one of sheet steel and plastic.

* * * * *